(12) United States Patent
Sung et al.

(10) Patent No.: US 10,008,741 B2
(45) Date of Patent: Jun. 26, 2018

(54) SULFIDE-BASED CRYSTALLIZED GLASS FOR ALL-SOLID SECONDARY BATTERY AND A METHOD FOR MANUFACTURING THE SAME

(71) Applicants: HYUNDAI MOTOR COMPANY, Seoul (KR); Industry-University Cooperation Foundation Hanyang University, Seoul (KR)

(72) Inventors: Ju Young Sung, Suwon-si (KR); Sam Ick Son, Suwon-si (KR); Min Yong Eom, Seoul (KR); Jung Hoon Kim, Seoul (KR); Dong Wook Shin, Seongnam-si (KR)

(73) Assignees: HYUNDAI MOTOR COMPANY, Seoul (KR); Industry-University Cooperation Foundation Hanyang University, Seoul (KR)

( * ) Notice: Subject to any disclaimer, the term of this patent is extended or adjusted under 35 U.S.C. 154(b) by 226 days.

(21) Appl. No.: 14/951,131

(22) Filed: Nov. 24, 2015

(65) Prior Publication Data

US 2016/0181656 A1   Jun. 23, 2016

(30) Foreign Application Priority Data

Dec. 18, 2014   (KR) .......................... 10-2014-0183522

(51) Int. Cl.
*H01M 10/0562* (2010.01)
*H01M 10/052* (2010.01)

(52) U.S. Cl.
CPC ..... *H01M 10/0562* (2013.01); *H01M 10/052* (2013.01); *H01M 2300/0068* (2013.01); *H01M 2300/0071* (2013.01)

(58) Field of Classification Search
None
See application file for complete search history.

(56) References Cited

FOREIGN PATENT DOCUMENTS

| CN | 102544580 A | 7/2012 |
|---|---|---|
| JP | 9-245828 A | 9/1997 |
| KR | 10-2008-0041627 A | 5/2008 |
| KR | 10-2011-0055635 A | 5/2011 |
| KR | 10-2011-0120916 A | 11/2011 |
| KR | 10-1181148 B1 | 9/2012 |
| KR | 10-2013-0130862 A | 12/2013 |
| WO | 2012/001773 A1 | 1/2012 |

OTHER PUBLICATIONS

Ryoji Kanno et al., "Lithium Ionic conductor Thio-LISICON", Journal of the Electrochemical Society, 148 (7) A742-A0746, 2001.

*Primary Examiner* — Sarah A. Slifka
(74) *Attorney, Agent, or Firm* — McDermott Will & Emery LLP

(57) ABSTRACT

A sulfide-based crystallized glass for an all-solid secondary battery has a sulfide that includes $Li_2S$ and $P_2S_5$, wherein the sulfide-based crystallized glass consists of 1 to 5% by mole of $Li_3BO_3$. A method for manufacturing the sulfide-based crystallized glass comprises steps of mixing (1) 75 to 80% by mole of $Li_2S$ and 20 to 25% by mole of $P_2S_5$, and then mixing (2) 95 to 99% by mole of obtained mixture at (1) and 1 to 5% by mole of $Li_3BO_3$ with a mechanical milling method, and subjecting the mixture thus obtained to a heat-treatment process.

11 Claims, 7 Drawing Sheets

SULFIDE-BASED CRYSTALLIZED GLASS FOR ALL-SOLID SECONDARY BATTERY AND A METHOD FOR MANUFACTURING THE SAME

CROSS-REFERENCE TO RELATED APPLICATION

This application claims priority under 35 U.S.C. § 119(a) to Korean Patent Application No. 10-2014-0183522 filed on Dec. 18, 2014, the entire content of which is incorporated herein by reference.

TECHNICAL FIELD

The present disclosure relates to a sulfide-based crystallized glass for an all-solid secondary battery, and a method for manufacturing the same. More particularly, it relates to a sulfide-based crystallized glass including lithium borate for an all-solid secondary battery, and a method for manufacturing the same, in which the doorway section in a migration passage of a lithium ion is expanded by an anion substitution reaction by adding a lithium borate to $Li_2S$—$P_2S_5$ (a sulfide), thereby improving lithium-ionic conductivity; and the lithium borate may be easily doped by a mechanical milling method and a heat-treatment process using a relatively low temperature, and, as such, industrial production is possible and economic feasibility is excellent.

BACKGROUND

Recently, demand for a secondary battery is increasing in various industrial fields, such as cellular phones, notebook computers, small domestic appliances, automobiles, and bulk power storage systems. Therefore, research on improving the performance of a secondary battery is vigorously proceeding.

A secondary battery is composed of an anode prepared by using a carbon material or a lithium material, a cathode prepared by using a metallic oxide, such as $LiNiO_2$ and $LiCoO_2$, and an electrolyte located therebetween.

When charging a secondary battery, a lithium ion is de-intercalated from a cathode, is moved through the electrolyte, and then, is intercalated in an anode, thereby turning electrical energy into chemical energy and storing the chemical energy. When discharging a secondary battery, the reverse mechanism proceeds to supply electrical energy to an external circuit, and the lithium ion intercalated in an anode is again moved to the cathode. In other words, the electrolyte acts as a medium for carrying the lithium ion to be oxidized or reduced in the anode or the cathode within the battery.

At present, the electrolyte for a secondary battery is mainly limited to a liquid electrolyte. The liquid electrolyte has an advantage, that is, high lithium-ionic conductivity, but it is mainly composed of flammable organic materials, and thus may be dangerous, such as, from a leakage, or a fire or explosion at high temperature.

Therefore, in the case of a small battery, or a secondary battery used for automobiles or power storage, there may be a danger to a person's health from a fire or an explosion.

The above-described problem associated with a liquid electrolyte may be solved by instead employing a safer, inorganic-based solid electrolyte. The solid electrolyte is divided into an oxide-based and a sulfide-based solid electrolyte. The electrostatic binding energy of sulfur is lower than that of oxygen, and thus, a sulfide-based solid electrolyte exhibits higher lithium-ionic conductivity as compared with an oxide-based solid electrolyte.

In addition, since a sulfide-based solid electrolyte is stable over a wide range of voltages, a sulfide-based solid electrolyte can be used to be used as a high-voltage electrode material that is difficult to be used for conventional liquid electrolyte.

The prior art discloses a sulfide-based crystallized glass having excellent economic feasibility, in which sulfide-based crystallized glass exhibits high lithium-ionic conductivity at room temperature, and can be industrially manufactured by promoting a decrease in the temperature required for a heat-treatment and a decrease in the amount of lithium included in electrolyte.

However, since a sulfide-based solid electrolyte has still low lithium-ionic conductivity as compared with a liquid electrolyte, more research into developing solid electrolytes having improved lithium-ionic conductivity is required.

The above information disclosed in this Background section is only for the enhancement of understanding of the background of the disclosure and therefore may include information that does not form the prior art that is already known in this country to a person of ordinary skill in the art.

SUMMARY OF THE DISCLOSURE

An aspect of the present disclosure provides a sulfide-based crystallized glass having improved lithium-ionic conductivity by generating an anion substitution through adding a lithium borate to a sulfide-based crystallized glass that is a raw material for a solid electrolyte.

Another aspect of the present disclosure provides a method for easily adding a lithium borate to a sulfide-based crystallized glass through a mechanical milling method.

The present disclosure is not limited thereto, and other aspects that are not described may be clearly understood by a person of ordinary skill in the art from the following descriptions.

An embodiment of the present inventive concept relates to a sulfide-based crystallized glass for an all-solid secondary battery, having a sulfide that includes $Li_2S$ and $P_2S_5$, wherein the sulfide-based crystallized glass consists of 1 to 5% by mole of $Li_3BO_3$.

According to an embodiment of the present inventive concept, the sulfide is composed of 75 to 80% by mole of $Li_2S$ and 20 to 25% by mole of $P_2S_5$.

According to an embodiment of the present inventive concept, the sulfide-based crystallized glass includes at least one of a $PO_4^{3-}$ ion, a $PS_4^{3-}$ ion, and a $BS_3^{3-}$ ion.

According to another embodiment of the present inventive concept, an ionic conductivity of the sulfide-based crystallized glass is $0.77 \times 10^{-3}$ S/cm to $1.03 \times 10^{-3}$ S/cm.

According to another embodiment of the present inventive concept, an activation energy of the sulfide-based crystallized glass is 20.7 kJ/mol to 24.0 kJ/mol.

According to another embodiment of the present inventive concept, the $Li_3BO_3$ is prepared by mixing lithium carbonate ($Li_2CO_3$) and boron oxide ($B_2O_3$), melting the mixture thus obtained at 900 to 1000° C., and then quenching the mixture thus obtained to reach room temperature.

According to an embodiment of the present inventive concept, a method for manufacturing a sulfide-based crystallized glass for an all-solid secondary battery, the method comprising steps of mixing (1) 75 to 80% by mole of $Li_2S$ and 20 to 25% by mole of $P_2S_5$, and then mixing (2) 95 to 99% by mole of obtained mixture at (1) and 1 to 5% by mole of Li$_3$BO$_3$ by mechanical milling, and subjecting the mixture thus obtained to heat-treatment.

According to another embodiment of the present inventive concept, the mechanical milling method is performed by mixing at 300 to 520 RPM for 20 to 25 hours using a ball mill apparatus.

According to another embodiment of the present inventive concept, the heat-treatment process is performed at 220 to 250° C.

According to an embodiment of the present inventive concept, a solid electrolyte is prepared using the sulfide-based crystallized glass for an all-solid secondary battery as a raw material.

According to an embodiment of the present inventive concept, an all-solid secondary battery is prepared using the solid electrolyte for an all-solid secondary battery.

Other aspects and embodiments of the inventive concept are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (for example, fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present inventive concept will now be described in detail with reference to certain exemplary embodiments thereof illustrated the accompanying drawings which are given hereinbelow by way of illustration only, and thus are not limitative of the present inventive concept, and wherein.

Figure 1:
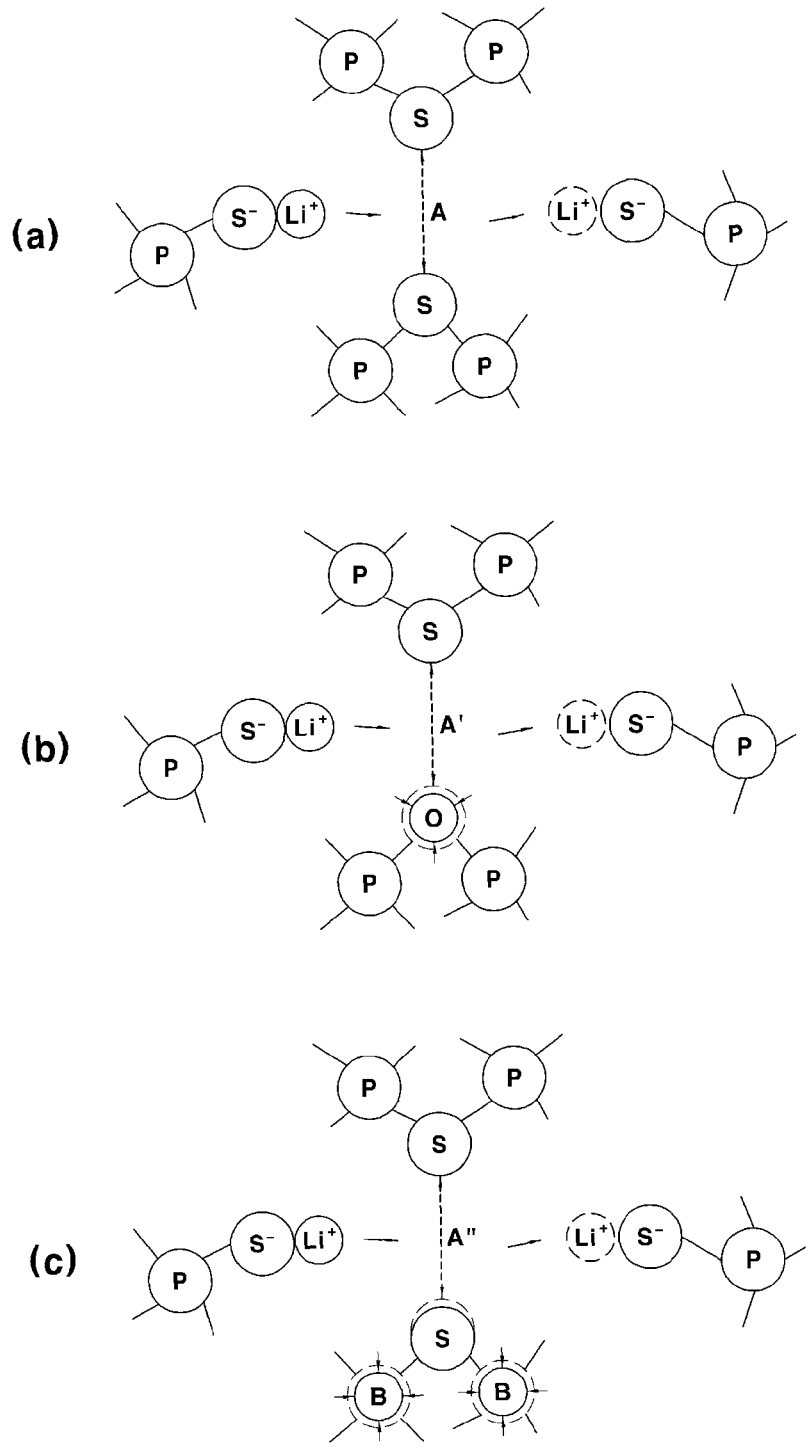
FIG. 1 is a schematic diagram illustrating the expanded doorway section being in a migration passage of a lithium ion in the sulfide-based crystallized glass for an all-solid secondary battery according to the present inventive concept.

It should be understood that the appended drawings are not necessarily to scale, presenting a somewhat simplified representation of various features illustrative of the basic principles of the inventive concept. The specific design features of the present inventive concept as disclosed herein, including, for example, specific dimensions, orientations, locations, and shapes will be determined in part by the particular intended application and use environment.

In the figures, reference numbers refer to the same or equivalent parts of the present inventive concept throughout the several figures of the drawing.

DETAILED DESCRIPTION

Hereinafter reference will now be made in detail to various embodiments of the present inventive concept, examples of which are illustrated in the accompanying drawings and described below. While the inventive concept will be described in conjunction with exemplary embodiments, it will be understood that present description is not intended to limit the inventive concept to those exemplary embodiments. On the contrary, the inventive concept is intended to cover not only the exemplary embodiments, but also various alternatives, modifications, equivalents and other embodiments, which may be included within the spirit and scope of the inventive concept as defined by the appended claims.

Hereinafter, the sulfide-based crystallized glass (hereinafter, referred to as "a sulfide-based crystallized glass") including a lithium borate for an all-solid secondary battery and a method for manufacturing the same according to the various embodiments of the present inventive concept will be described with reference to the following drawings. For describing the present inventive concept, when it is considered that the detailed descriptions about the related known constitutions or functions thereof cloud the main point of the present inventive concept, the detailed descriptions will not be provided.

The sulfide-based crystallized glass of the present inventive concept is composed of 0.78×(100−X) mol % of Li$_2$S, 0.22×(100−X) mol % of P$_2$S$_5$, and X mol % of Li$_3$BO$_3$.

The X means the mol % of Li$_3$BO$_3$ that is a lithium borate included in the sulfide-based crystallized glass, and may have a value between 1 and 5. When the value of X is 5 or more, the proportion of lithium borate (Li$_3$BO$_3$) having low conductivity is large inside the sulfide-based (Li$_2$S—P$_2$S$_5$) crystallized glass, and thus, the lithium-ionic conductivity tends to decrease.

As compared with the conventional crystallized glass being only composed of Li$_2$S—P$_2$S$_5$, for the sulfide-based crystallized glass, the PS$_4^{3-}$ ion of the P$_2$S$_5$ is anionic-substituted by Li$_3$BO$_3$.

The anion substitution is progressed as the following Chemical Equation:

$$3PS_4^{3-} + 4BO_3^{3-} \rightarrow 3PO_4^{3-} + 4BS_3^{3-} \qquad \text{[Chemical Equation 1]}$$

Referring to FIG. 1, the PS$_4^{3-}$ ion being located in the doorway section of the migration passage for conducting the lithium ion in the sulfide-based crystallized glass becomes a small $PO_4^{3-}$ or $BS_3^{3-}$ by $BO_3^{3-}$ of $Li_3BO_3$ doped into the sulfide-based crystallized glass, and thus, as compared with the doorway (A) of FIG. 1(a), the doorway (A') of FIG. 1(b) and the doorway (A") of FIG. 1(c) are expanded. Therefore, since the lithium ion may pass through the doorway, and thus, may be easily moved, the lithium-ionic conductivity is improved.

The method for manufacturing a sulfide-based crystallized glass of the present inventive concept may include mixing 0.78×(100−X) mol % of $Li_2S$, 0.22×(100−X) mol % of $P_2S_5$, and X mol % of $Li_3BO_3$ using a mechanical milling method; and subjecting the mixture thus obtained to a heat-treatment process.

As the $Li_2S$ and $P_2S_5$, the products may be used as long as they are industrially prepared.

The $Li_3BO_3$ is prepared by mixing lithium carbonate ($Li_2CO_3$) and a boron oxide ($B_2O_3$) in a molar ratio of 3:1; sufficiently melting the mixture thus obtained at the temperature of 900° C. or higher; and then, quenching the mixture thus obtained to be room temperature.

The starting materials may be appropriately weighed and mixed in a mortar, and then, the mixture may be amorphized using a mechanical milling method. In one embodiment, the mechanical milling method may use a planetary ball mill that can effectively generate high-impact energy by conducting the revolution and rotation at the same time.

The mechanical milling method may be performed in the presence of a nitrogen or argon gas. This is because water vapor may easily react with the starting materials.

For the mechanical milling method, as the revolutions per minutes of the ball mill apparatus may be high, the production rate of the sulfide-based crystallized glass may be rapid, and as the revolution time increases, the rate for converting the raw materials into the sulfide-based crystallized glass will increase. According to one embodiment of the present inventive concept, the mechanical milling method is performed at the revolutions per minutes of 300 RPM or more for the revolution time of 20 hours or more.

According to the mechanical milling method, as compared with the conventional melting-quenching method, it is possible to make the thing to be milled to be in a uniform amorphous state, and since the method is performed at room temperature, the effectiveness of the manufacturing process is excellent. In addition, unlike the melting-quenching method, since a melting point or a freezing point is not taken into a consideration, it is suitable for adding $Li_3BO_3$ for the present inventive concept.

Figure 2:
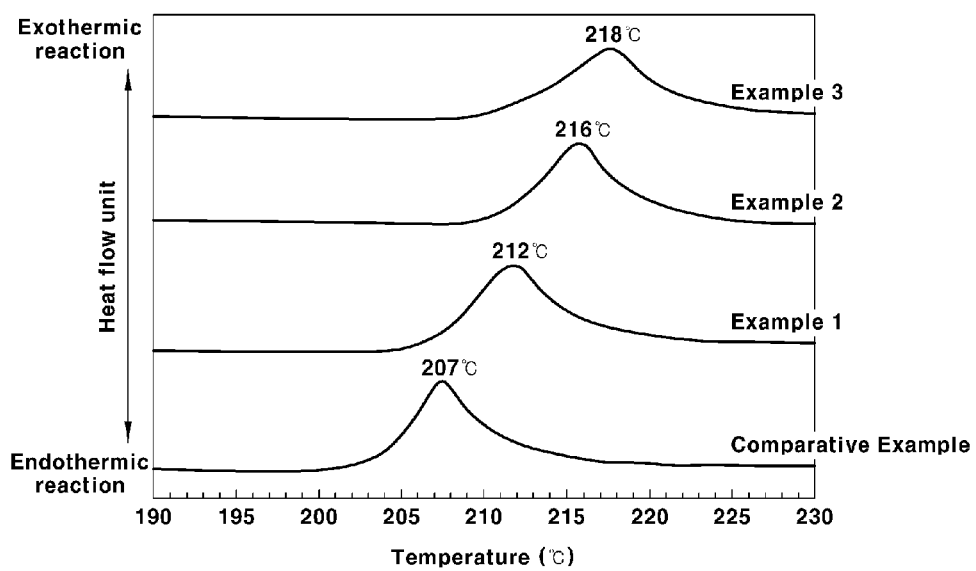
FIG. 2 is a graph illustrating the results for thermal-analyzing the sulfide-based crystallized glass immediately after performing a mechanical milling method for the method for manufacturing the sulfide-based crystallized glass for an all-solid secondary battery according to the present inventive concept.

After mixing the starting materials and then subjecting the mixture thus obtained to an amorphizing process by the mechanical milling method, the heat-treatment process is a process for crystallizing the mixture. Referring to FIG. 2, the crystallizing temperature for each of the compositions may be known by analyzing a heat flow unit according to the temperature of the sulfide-based glass including lithium borate. Therefore, it is performed under the condition of 220 to 250° C. that is slightly higher than each of the peaks.

When the heat-treatment process is performed at 220° C. or lower, the crystallized glass having the composition of X=1 may not be crystallized, and when it is performed at 250° C. or higher, the effectiveness of the process may be deteriorated.

EXAMPLES

Preparation Example (Lithium Borate)

Lithium carbonate ($Li_2CO_3$) and a boron oxide ($B_2O_3$) were weighed in a molar ratio of 3:1, and then were uniformly mixed by a ball mill process for 12 hours. The mixture that was uniformly mixed was added in an alumina crucible; the temperature thereof was increased to be 900° C. at a rate of 5° C. per a minute using a vertical-type furnace; and then, the mixture thus obtained was melted for 2 hours. The liquid was sufficiently melted and was then quenched to be room temperature to obtain a lithium borate ($Li_3BO_3$) powder.

Example 1 (X=1)

$Li_2S$, $P_2S_5$ and $Li_3BO_3$ were used as a starting material. The starting materials were weighed in the mole ratio of 77.22:21.78:1, respectively, in the presence of argon gas in a glove box; the starting materials were uniformly mixed; and then; the mixed starting materials were transferred to an alumina pot having a volume of 100 ml. After adding 12 zirconia balls having a diameter of 10 mm thereto, the mechanical milling was sufficiently performed using a ball mill apparatus at 520 RPM for 25 hours.

After mechanical milling for 3 hours, a heat-treatment process was performed at a temperature that is 20° C. higher than the crystallizing peak based on the thermal analyzing result of FIG. 2.

Example 2 (X=3)

Example 2 was performed in the same method as Example 1, except that the starting materials were weighed in the mole ratio of 75.66:21.34:3, respectively, and the heat-treatment process was performed at the corresponding temperature condition (20° C. higher than the crystallizing peak of FIG. 2).

Example 3 (X=5)

Example 2 was performed in the same method as Example 1, except that the starting materials were weighed in the mole ratio of 74.1:20.9:5, respectively, and the heat-treatment process was performed at the corresponding temperature condition (20° C. higher than the crystallizing peak of FIG. 2).

Comparative Example (X=0)

Comparative Example was performed in the same method as Example 1, except that the starting materials were weighed in the mole ratio of 78:22:0, respectively, and the heat-treatment process was performed at the corresponding temperature condition (20° C. higher than the crystallizing peak of FIG. 2).

Figure 3:
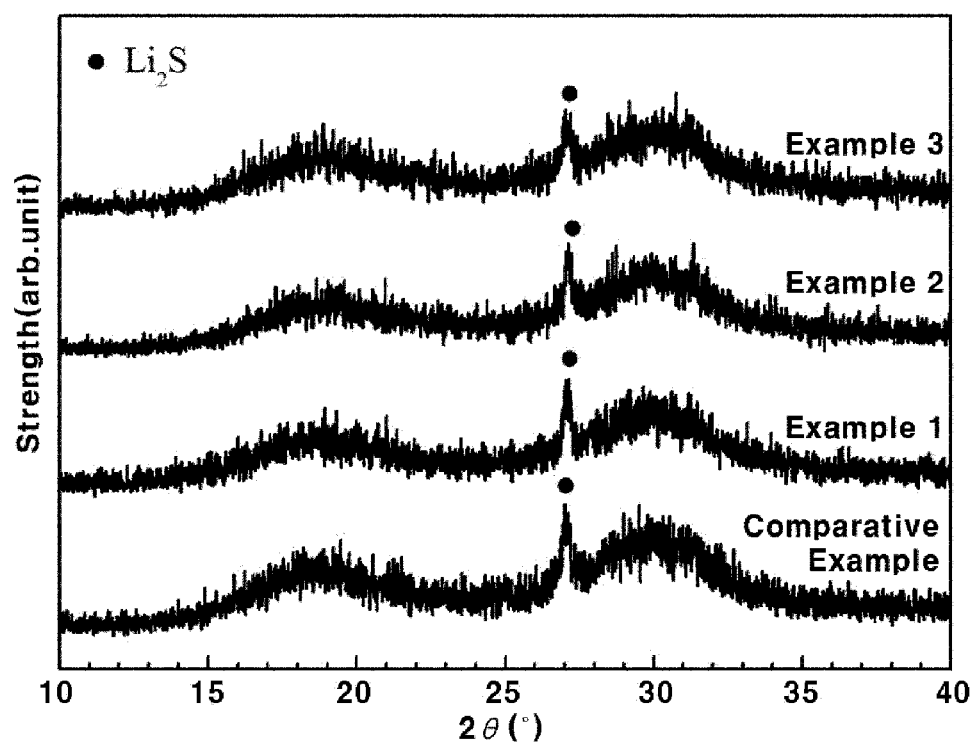
FIG. 3 is a diagram illustrating the result of X-ray diffraction of the sulfide-based crystallized glass immediately after performing a mechanical milling method for manufacturing the sulfide-based crystallized glass for an all-solid secondary battery according to the present inventive concept.

FIG. 3 is a diagram illustrating the results of X-ray diffraction of the sulfide-based crystallized glasses after performing a mechanical milling method and before a heat-treatment process for the Examples. Through the mechanical milling, the peak of $Li_2S$ that was a starting material was observed, but the peak was a very small peak, and other peaks were not exhibited. Therefore, it could be confirmed that the starting materials were sufficiently mixed and were found to be amorphous by the mechanical milling.

Figure 4:
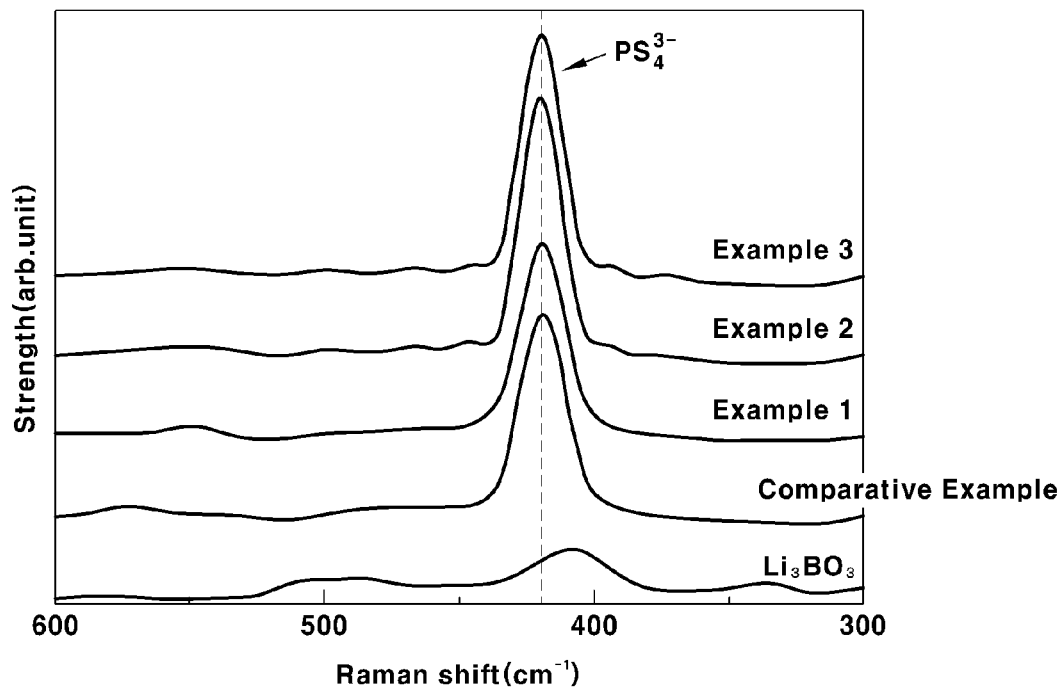
FIG. 4 is a diagram illustrating the result of analyzing the local structure of the sulfide-based crystallized glass for an all-solid secondary battery according to the present inventive concept by Raman spectroscopy.
Figure 5:
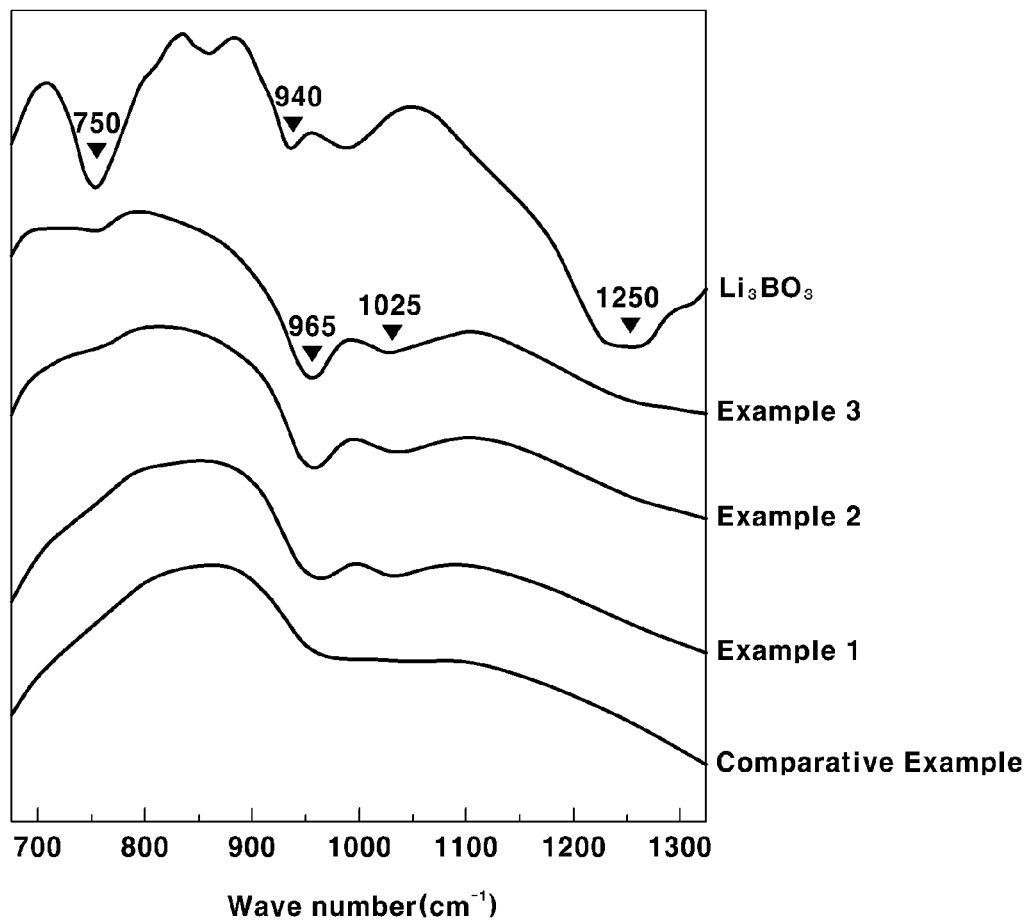
FIG. 5 is a diagram illustrating the result of analyzing the local structure of the sulfide-based crystallized glass for an all-solid secondary battery according to the present inventive concept by infrared spectroscopy.

FIG. 4 is a diagram illustrating the results of analyzing the local structures of the Examples by Raman spectroscopy, and FIG. 5 is a diagram illustrating the result of analyzing the local structure of Examples by infrared spectroscopy. Referring to FIG. 4, it could be confirmed that the sulfide-based crystallized glasses prepared in the Examples mainly included a $PS_4^{3-}$ ion derived from $P_2S_5$ among the starting materials (see M. Tachez J. P. Malugani, R. Mercier, G. Robert, Solid State Ionics 14 (1984) 181p). However, referring to FIG. 5, in the Comparative Example, it could be confirmed that the peaks were found at the wave numbers of 750, 940, and 1250 cm$^{-1}$, and these peaks related to an $BO_3^{3-}$ ion being in $Li_3BO_3$ that was a starting material (see E. I. Kamitsos, A. P. Patsis, M. A. Karakassides, G. D. Chryssikos, J Non-Cryst Solids 126 (1990) 52p). However, it could also be confirmed that the wave numbers of 965 and 1025 cm$^{-1}$ that were not found in Comparative Example were found in Examples. These peaks related to a $PO_4^{3-}$ ion (see A. A. Salah, P. Jozwiak, K. Zaghib, J. Garbarczyk, F. Gendron, A. Mauger, C. M. Julien, Spectrochim Acta A 65 (2006) 1007p). By the fact that the peak related to a $BO_3^{3-}$ ion constituting a starting material was not found, but the peak related to a $PO_4^{3-}$ ion was found, it could be confirmed that some of the $PS_4^{3-}$ ions were anion-substituted into the $PO_4^{3-}$ and the $BO_3^{3-}$ ion was anion-substituted into the $BS_3^{3-}$.

Figure 6:
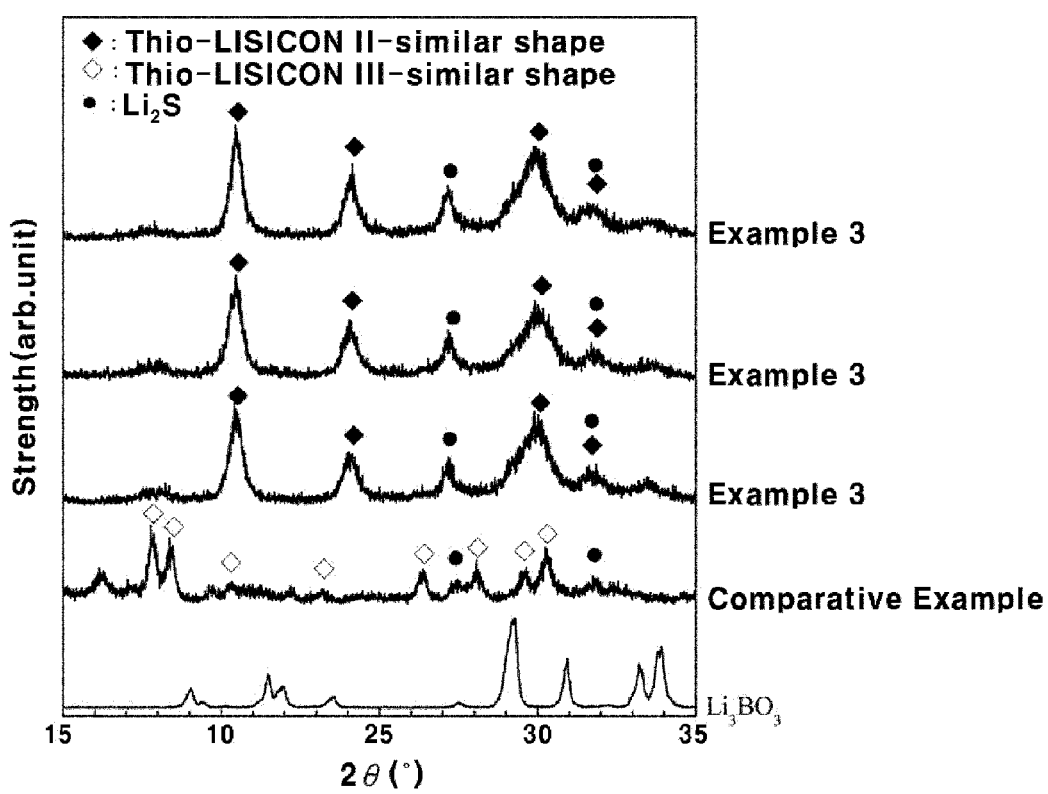
FIG. 6 is a diagram illustrating the result of X-ray diffraction of the sulfide-based crystallized glass for an all-solid secondary battery according to the present inventive concept.

FIG. 6 is a diagram illustrating the results of X-ray diffraction of the sulfide-based crystallized glasses prepared in the Examples. For Comparative Example without a lithium borate, the shape that was similar to Thio-LISICON III was formed, but for the Examples including a lithium borate, the shape that was similar to Thio-LISICON II was formed.

According to Ryoji Kanno, Masahiro Murayama, *Journal of The Electrochemical Society,* 148(7) A742 to A746 (2001) "Lithoum Ionic Conductor Thio-LISICON", it was found that as compared with the structure of Thio-LISICON III, the structure of Thio-LISICON II was favorable for lithium-ionic conduction. Therefore, it could be confirmed that the sulfide-based crystallized glass was changed into the structure that was favorable for lithium-ionic conduction by adding a lithium borate.

Figure 7:
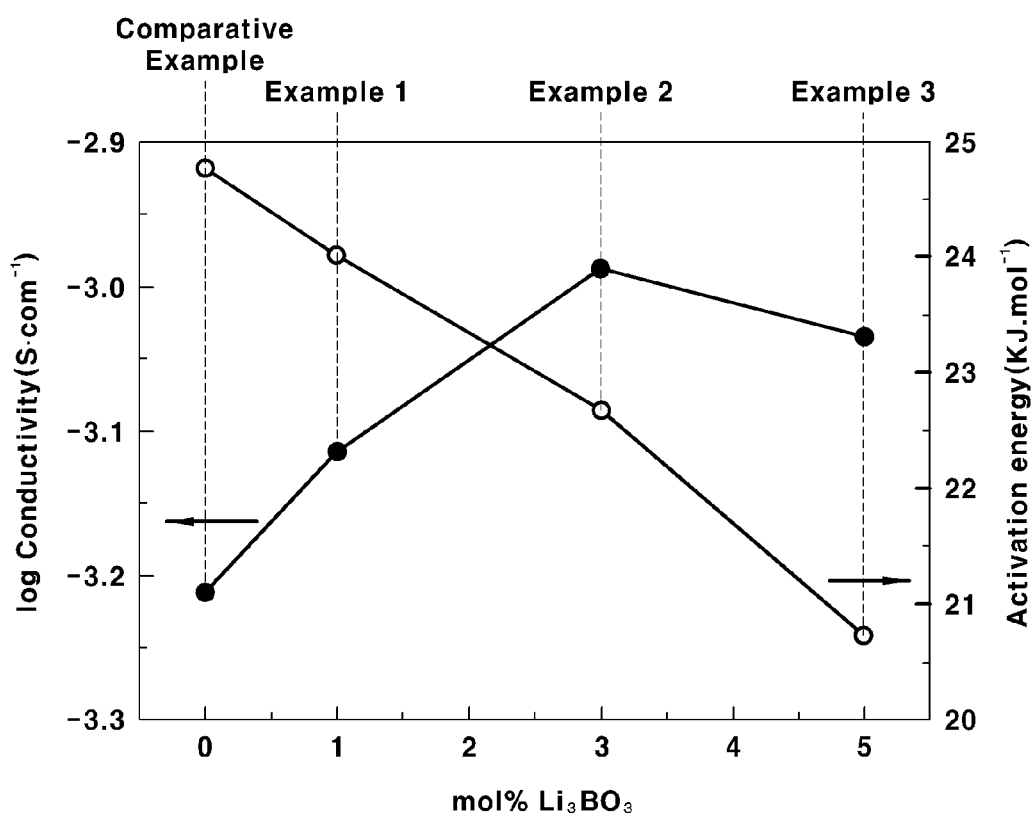
FIG. 7 is a graph illustrating the lithium-ionic conductivity and activation energy of the sulfide-based crystallized glass for an all-solid secondary battery according to the present inventive concept.

FIG. 7 is a graph illustrating the lithium-ionic conductivities and activation energies of the sulfide-based crystallized glasses prepared in the Examples. In Example 2, 1.03×10$^{-3}$ S/cm that was highest lithium-ionic conductivity was measured. Generally, in the case of a lithium secondary battery including a solid electrolyte, it requires ionic conductivity of 10$^{-3}$ S/cm at room temperature, and thus, the sulfide-based crystallized glass according to the present inventive concept can be industrially used.

In addition, as the mole ratio of a lithium borate in Examples was increased, the activation energy was consistently reduced. Therefore, as described above, it could be confirmed that the doorway section being in the migration passage of a lithium ion in the sulfide-based crystallized glass was expanded.

It was determined that in Example 3, the lithium-ionic conductivity was decreased because even though the doorway was expanded, the mole ratio of a lithium borate was increased, and thus, the oxide-based composition having low conductivity was increased.

The sulfide-based crystallized glass according to the present inventive concept has the structure having the expanded doorway section being in the migration passage of a lithium ion by adding $Li_3BO_3$, a lithium borate, to the crystallized glass that is only composed of the conventional $Li_2S$—$P_2S_5$, and thus, exhibits high lithium-ionic conductivity, that is, 1.03×10$^{-3}$ S/cm. Therefore, it is suitable to be a raw material for a solid electrolyte in an all-solid secondary battery.

In addition, a mechanical milling method and a heat-treatment process that are a method for manufacturing the sulfide-based crystallized glass is performed under conditions that can be easily performed on an industrial scale, thereby providing excellent economic feasibility.

As set forth above, according to the embodiments of the present inventive concept, the doorway section of a migration passage of a lithium ion in solid electrolyte is expanded, thereby improving lithium-ionic conductivity.

According to the embodiments of the present inventive concept, it is possible to provide a method for manufacturing a sulfide-based crystallized glass, in which lithium borate is easily doped and a melting temperature of a sulfide-based crystallized glass is relatively low, and thus, the industrial production thereof can be implemented and the economic feasibility thereof is excellent.

The inventive concept has been described in detail with reference to various embodiments thereof. However, it will be appreciated by those skilled in the art that changes may be made to these embodiments without departing from the principles and spirit of the inventive concept, the scope of which is defined in the appended claims and their equivalents.

What is claimed is:

1. A sulfide-based crystallized glass for an all-solid secondary battery, comprising:
    a sulfide including $Li_2S$ and $P_2S_5$; and 1 to 5% by mole of $Li_3BO_3$.

2. The sulfide-based crystallized glass of claim 1,
    wherein the sulfide is composed of 75 to 80% by mole of $Li_2S$ and 20 to 25% by mole of $P_2S_5$.

3. The sulfide-based crystallized glass of claim 1,
    wherein the sulfide-based crystallized glass includes at least one of a $PO_4^{3-}$ ion, a $PS_4^{3-}$ ion, and a $BS_3^{3-}$ ion.

4. The sulfide-based crystallized glass of claim 1, wherein an ionic conductivity of the sulfide-based crystallized glass is 0.77×10$^{-3}$ S/cm to 1.03×10$^{-3}$ S/cm.

5. The sulfide-based crystallized glass of claim 1, wherein an activation energy of the sulfide-based crystallized glass is 20.7 kJ/mol to 24.0 kJ/mol.

6. The sulfide-based crystallized glass of claim 1, wherein the $Li_3BO_3$ is prepared by mixing lithium carbonate ($Li_2CO_3$) and boron oxide ($B_2O_3$), melting the mixture at 900 to 1000° C., and then quenching the mixture to reach room temperature.

7. A solid electrolyte for an all-solid secondary battery, the solid electrolyte being prepared using the sulfide-based crystallized glass of claim 1 as a raw material.

8. An all-solid secondary battery prepared using the solid electrolyte for an all-solid secondary battery of claim 7.

9. A method for manufacturing a sulfide-based crystallized glass for an all-solid secondary battery, the method comprising steps of
    mixing 75 to 80% by mole of $Li_2S$, 20 to 25% by mole of $P_2S_5$, and 1 to 5% by mole of $Li_3BO_3$ by mechanical milling,
    and subjecting the mixture to heat-treatment.

10. The method of claim 9, wherein the mechanical milling method is performed by mixing at 300 to 520 RPM for 20 to 25 hours using a ball mill apparatus.

11. The method of claim 9, wherein the heat-treatment process is performed at 220 to 250° C.

* * * * *